US008651589B2

(12) United States Patent
Ishikawa et al.

(10) Patent No.: US 8,651,589 B2
(45) Date of Patent: Feb. 18, 2014

(54) CONTROL DEVICE OF INDUSTRIAL VEHICLE, AND INDUSTRIAL VEHICLE LOADED WITH THE DEVICE

(75) Inventors: Naoki Ishikawa, Sagamihara (JP); Katsumi Ueda, Sagamihara (JP); Masanobu Seki, Sagamihara (JP)

(73) Assignee: Mitsubishi Nichiyu Forklift Co., Ltd., Kyoto (JP)

( * ) Notice: Subject to any disclaimer, the term of this patent is extended or adjusted under 35 U.S.C. 154(b) by 105 days.

(21) Appl. No.: 12/680,818

(22) PCT Filed: Jul. 22, 2008

(86) PCT No.: PCT/JP2008/063479
§ 371 (c)(1),
(2), (4) Date: May 13, 2010

(87) PCT Pub. No.: WO2009/107258
PCT Pub. Date: Sep. 3, 2009

(65) Prior Publication Data
US 2010/0308644 A1 Dec. 9, 2010

(30) Foreign Application Priority Data
Feb. 27, 2008 (JP) ................................. 2008-046864

(51) Int. Cl.
*B60T 8/32* (2006.01)
(52) U.S. Cl.
USPC ............................................. 303/191; 303/89
(58) Field of Classification Search
USPC .................................... 303/89, 191; 188/265
See application file for complete search history.

(56) References Cited

U.S. PATENT DOCUMENTS

| 4,220,050 A | | 9/1980 | Friesen et al. | |
|---|---|---|---|---|
| 4,451,095 A | * | 5/1984 | Chichester et al. | 303/71 |
| 5,052,532 A | * | 10/1991 | Plate | 192/219.4 |
| 5,630,489 A | * | 5/1997 | Bebernes | 192/219.4 |
| 2003/0221922 A1 | | 12/2003 | Callow | |
| 2004/0256168 A1 | * | 12/2004 | Ueda et al. | 180/273 |

FOREIGN PATENT DOCUMENTS

| DE | 196 32 863 A1 | 2/1998 |
|---|---|---|
| JE | 4-114857 U | 10/1992 |
| JP | 8-58343 A | 3/1996 |
| JP | 8-295212 A | 11/1996 |
| JP | 2004-352152 A | 12/2004 |
| JP | 2006-82602 A | 3/2006 |
| JP | 2007-51652 A | 3/2007 |
| JP | 2007-71135 A | 3/2007 |
| JP | 2007-326516 A | 12/2007 |

OTHER PUBLICATIONS

European Search Report mailed Jul. 4, 2011.

* cited by examiner

*Primary Examiner* — Bradley King
(74) *Attorney, Agent, or Firm* — Birch, Stewart, Kolasch & Birch, LLP

(57) ABSTRACT

A control device 10 of an industrial vehicle which performs the control of actuating a parking brake 7 during operator's absence in an industrial vehicle includes a seat switch 1, a vehicle speed sensor 2, and the parking brake 7 controlled by a parking brake solenoid 6, and a counter 11 which counts the elapsed time after the seat switch 1 detects the operator's absence. The control device sets the time corresponding to the time until the operator leaves the vehicle after the operator leaves the seat as a preset absence time. When the seat switch 1 has detected absence, a control signal which validates the parking brake 7 is output to the parking brake solenoid 6, thereby actuating the parking brake 7 if the vehicle speed shows a vehicle stopped state, and the elapsed time becomes equal to or more than the set absence time.

8 Claims, 5 Drawing Sheets

CONTROL DEVICE OF INDUSTRIAL VEHICLE, AND INDUSTRIAL VEHICLE LOADED WITH THE DEVICE

BACKGROUND OF THE INVENTION

1. Field of the Invention

The present invention relates to a control device of an industrial vehicle and an industrial vehicle loaded with this device, adapted to validate a parking brake (parking brake) automatically in the absence of an operator, thereby avoiding the danger of occurrence of an accident, and particularly relates to a control device of an industrial vehicle and an industrial vehicle loaded with this device, capable of reliably detecting operator absence, thereby preventing the malfunction of the control device.

2. Description of Related Art

Generally, in vehicles, including industrial vehicles, when the operator performing driving leaves his/her seat temporarily and leaves the vehicle, it is necessary for them to leave their seat while the vehicle is in a state in which a parking brake is locked in order to ensure safety.

However, when the operator has left his/her seat temporarily without stopping an engine or even in an engine stopped state, there is a danger that the vehicle may begin to move in an unmanned state if the parking brake does not work reliably or if the operator has forgotten to apply the parking brake. Therefore, vehicles including a safety device for avoiding this danger have been conventionally proposed.

For example, Patent Document 1 (Japanese Patent Application Laid-Open No. 2004-352152) discloses a safety device in which a seat switch which detects whether or not an operator is sitting on a driver's seat is provided, and the fact that the operator is away from the seat without applying the parking brake is detected by the seat switch to actuate a warning device.

As described above, when the operator has left his/her seat temporarily to leave the vehicle with an engine running or even in an engine stopped state, there is a danger that the vehicle will begin to move in an unmanned state if the operator has forgotten to apply the parking brake due to carelessness or the like.

Thus, the method of providing a seat switch in a seat portion of the vehicle and detecting operator absence to actuate the warning device becomes an effective safety measure. However, if the invention is applied to industrial vehicles represented by material handling machines, such as forklifts and reach stackers, or construction and civil engineering machines, such as motor graders, bulldozers, and wheel loaders, and if the warning device is a warning buzzer, there is a possibility that the operator will not be able to hear a noise when the warning buzzer is used in a noisy environment. Additionally, if the warning device is an alarm lamp or a warning sign, there is possibility that the operator will not notice if they are concentrating their attention on their work, and it cannot be definitively stated that safety is completely secured.

Additionally, techniques using the safety device interlocked with the seat switch have been variously suggested in the past. However, the industrial vehicles are often used in a work environment which is not organized, and the operator may bounce on his/her seat due to irregularities in the path being traveled. This may be erroneously detected as absence, and the safety device may malfunction. In particular, industrial vehicles often have a structure which does not include a suspension, and there is a danger that the malfunction of the safety device will manifest conspicuously.

SUMMARY OF THE INVENTION

Accordingly, the object of the invention is to provide a control device of an industrial vehicle and an industrial vehicle loaded with this device, capable of reliably detecting operator's absence, thereby avoiding the danger of an accident occurring during this absence, in view of the problems of the conventional technique.

Thus, in order to solve this problem, the invention provides a control device which performs the control of actuating a parking brake during operator's absence in an industrial vehicle including a seat switch which detects an operator seating state, a vehicle speed sensor which detects vehicle speed, and the parking brake controlled by a brake solenoid.

The control device includes a counter which counts the elapsed time after the seat switch detects the operator's absence, and sets the time corresponding to the time until the operator leaves the vehicle after the operator leaves his/hear seat as a preset absence time.

When the seat switch has detected absence, it is determined that the operator has completely left his/her seat to exit the vehicle and a control signal which validates the parking brake is output to the brake solenoid, thereby actuating the parking brake, if the vehicle speed detected by the vehicle speed sensor is equal to or less than a predetermined vehicle speed indicating a vehicle stopped state, and if the elapsed time counted by the counter becomes equal to or more than the set absence time.

Here, as for the set absence time, since a suspension is generally not interposed in a working vehicle applied to the invention, there is a case where an operator's hips may rise off the seat due to vehicle vibration or the like, or a case where the operator rises from the seat momentarily in order to observe the outside of the vehicle. In order to eliminate this kind of noise, the variation of the time until the operator leaves the vehicle after the operator has left his/her seat is statistically obtained (for example, A−3θ, A: Average value, θ: Standard deviation) in advance, and this time may be set as the set absence time.

According to the invention, it is possible to reliably detect operator's absence, and it is possible to avoid the danger that a vehicle begins to move in an unmanned state during this absence. That is, the time when the operator has left his/her seat is counted by the counter, and it is determined as absence only when the absence time becomes equal to or more than a set absence time which is stored in advance in a storage device. Therefore, it is possible to prevent absence from being erroneously detected, for example, when, although the operator has taken his/her seat, the operator has risen up momentarily from the seat and it is possible to reliably determine the absence state. Additionally, since a vehicle stopped state is determined by the vehicle speed sensor, the stopped state is reliably distinguished, and the above-described control is executed only in the stopped state. Therefore, safety further increases.

Additionally, the industrial vehicle includes a parking brake operating portion which controls the parking brake by operation of the operator.

When the validated parking brake is released, the release of the parking brake is validated only when seating is detected by the seat switch, and the parking brake is again switched to a release side after the parking brake is switched to a valid side in the parking brake operating portion by the operator.

In this way, it is possible to enhance the safety of driving by adopting a configuration in which a vehicle does not start if the operator does not perform the operation of validating the parking brake once by the parking brake operating portion, as a condition for the release of the validated parking brake.

Moreover, preferably, the industrial vehicle includes a shift range detecting means which detects a shift range instructed by shift operating means.

When the validated parking brake is released, the parking brake is released only when an input signal indicating forward or reverse is detected by the shift range detecting means in addition to the above release conditions. Thereby, safety is further enhanced.

Furthermore, by including the warning means for issuing a warning to the operator when the parking brake has been validated, the operator is able to notice that they have forgotten to apply the parking brake as a result of the warning issued to the operator, and it is possible to quickly perform suitable counter-measures during the absence.

Furthermore, the parking brake is a hydraulic negative brake released by a working fluid supplied from a pump driven by a prime mover provided in the industrial vehicle.

Here, the hydraulic negative brake is a brake which is brought into a (invalid) state where the brake is not valid when a working fluid has acted on the brake by a fluid pressure pump (hydraulic pump) driven by an engine and which is brought into a state where the brake is valid when fluid pressure does not act. For example, a brake which is brought into a state where the brake is braked when a working fluid (pressure oil) is not supplied to a brake cylinder and which supplies the working fluid to the brake cylinder during traveling to release braking is disclosed in Japanese Patent Application Laid-Open No. 2001-32207.

By applying to the hydraulic negative brake in this way, the parking brake is necessarily brought into a valid state and it is possible to provide an apparatus with high safety when an engine is completely turned OFF during a stop or when trouble or a defect, such as disconnection of the brake solenoid, has occurred.

Additionally, the invention is effective in an industrial vehicle loaded with the above-described brake and vehicle control device, particularly, an industrial vehicle in which a suspension serving as a shock absorber is not interposed particularly between a frame or a vehicle body, and an axle. Thereby, even in a vehicle in which shock or vibration is directly transmitted to a seat, operator's intermittent absence is not erroneously determined as the operator leaving the vehicle, and, even when the operator has left his/her seat without applying the parking brake, the parking brake comes to operate automatically. As a result, it is possible to provide an industrial vehicle with high safety and reliability.

As described above, according to the invention, it is possible to provide an industrial vehicle capable of reliably detecting operator's absence and improving the safety during absence.

That is, it is determined as absence only when the absence time counted by the counter becomes equal to or more than the above set absence time, and the vehicle stopped state is determined by the vehicle speed sensor. Therefore, it is possible to reliably determine that the operator has left his/her seat when the vehicle has stopped, and it is possible to prevent a malfunction where the parking brake operates at another time than the above.

Additionally, by applying the invention to an industrial vehicle in which the parking brake is a hydraulic negative brake, it is possible to adopt an apparatus with higher safety.

Additionally, it is possible to enhance the safety of driving by adopting a configuration in which a vehicle does not start if the operator does not perform the operation of validating the parking brake once by the parking brake operating portion when the parking brake validated during absence is released. In addition to this, the safety during release is further increased by adopting a configuration in which the parking brake is released only when the shift range detecting means has detected an input signal indicating forward or reverse.

Moreover, the operator is able to notice that they have forgotten to apply the parking brake as a result of the warning issued to the operator, and it is possible to quickly perform suitable operation during the absence.

DETAILED DESCRIPTION OF THE INVENTION

An embodiment of the invention will be illustratively described below in detail with reference to the drawings. Here, the dimensions, materials, shapes, relative arrangements, etc. of component parts described in these embodiments, and the definitions of ON/OFF conditions of various parts in a control system are not meant to limit the scope of the invention, but are merely explanatory examples, especially where there is no specific description.

Figure 1:
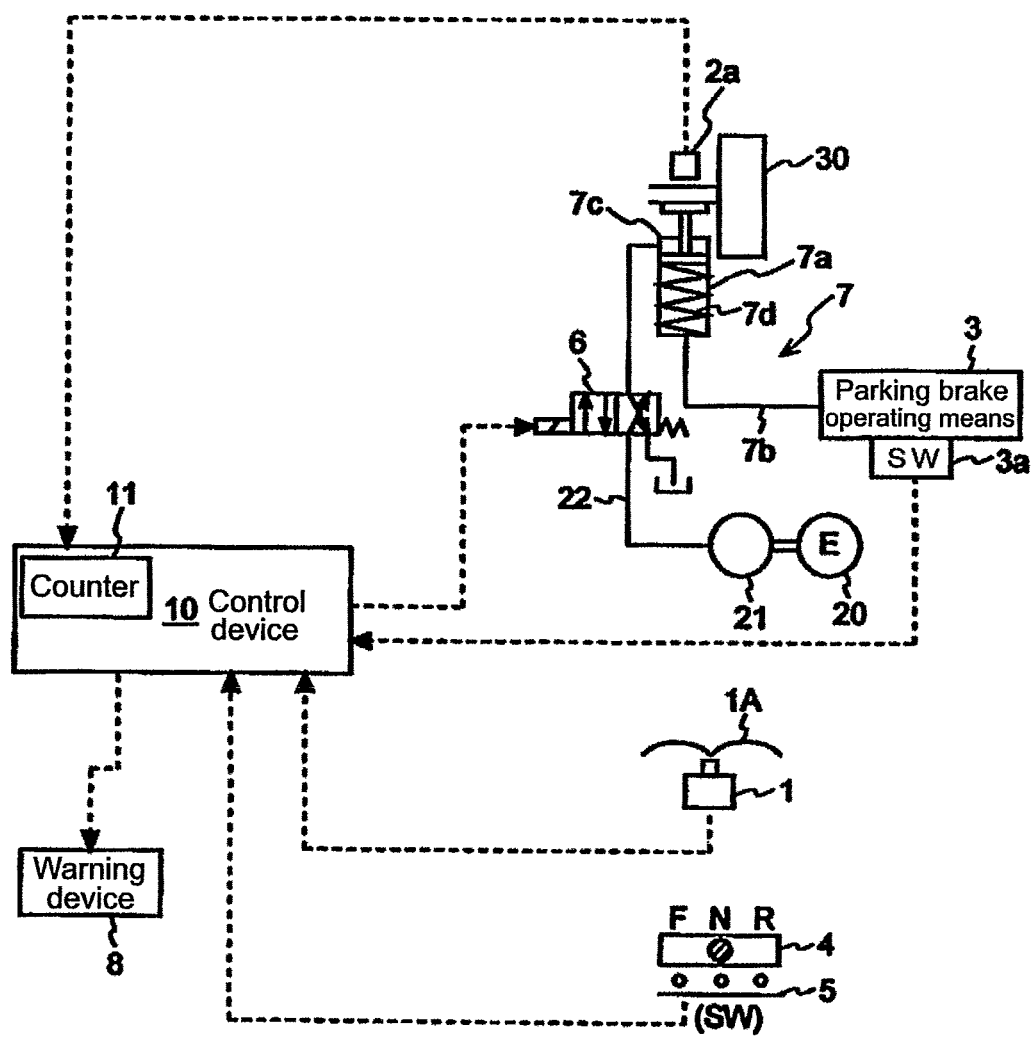
FIG. 1 is a schematic configuration view of a control device according to an embodiment of the invention and a peripheral device thereof.
Figure 2:
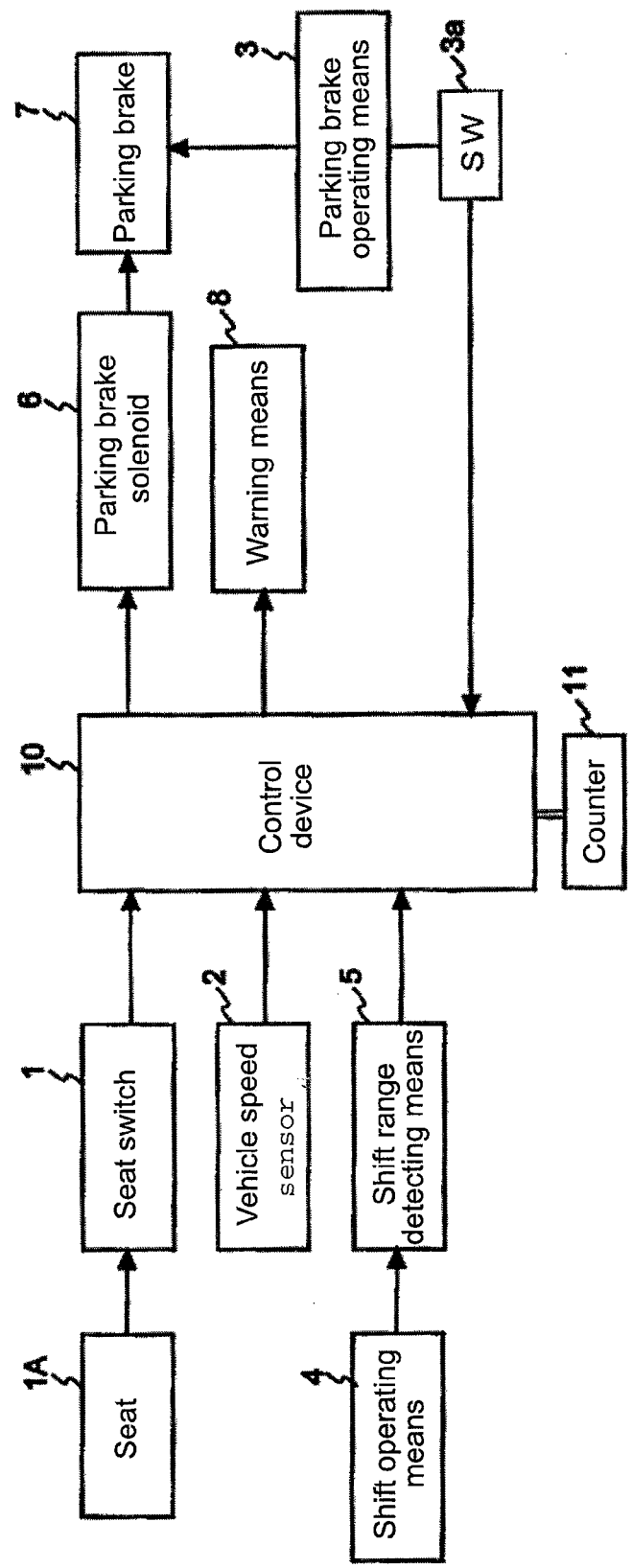
FIG. 2 is a block diagram of the control device according to the embodiment of the invention.
Figure 3:
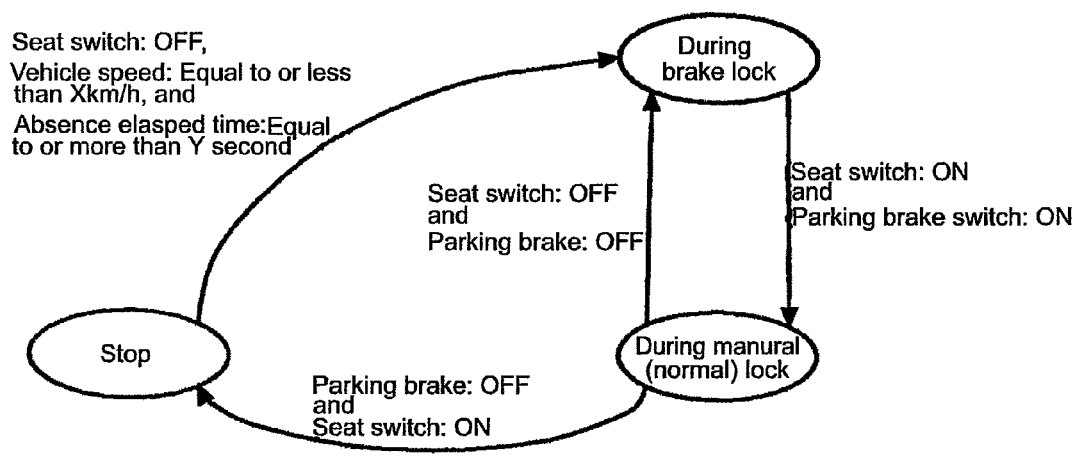
FIG. 3 is a state transition diagram illustrating control according to the embodiment of the invention.
Figure 4:
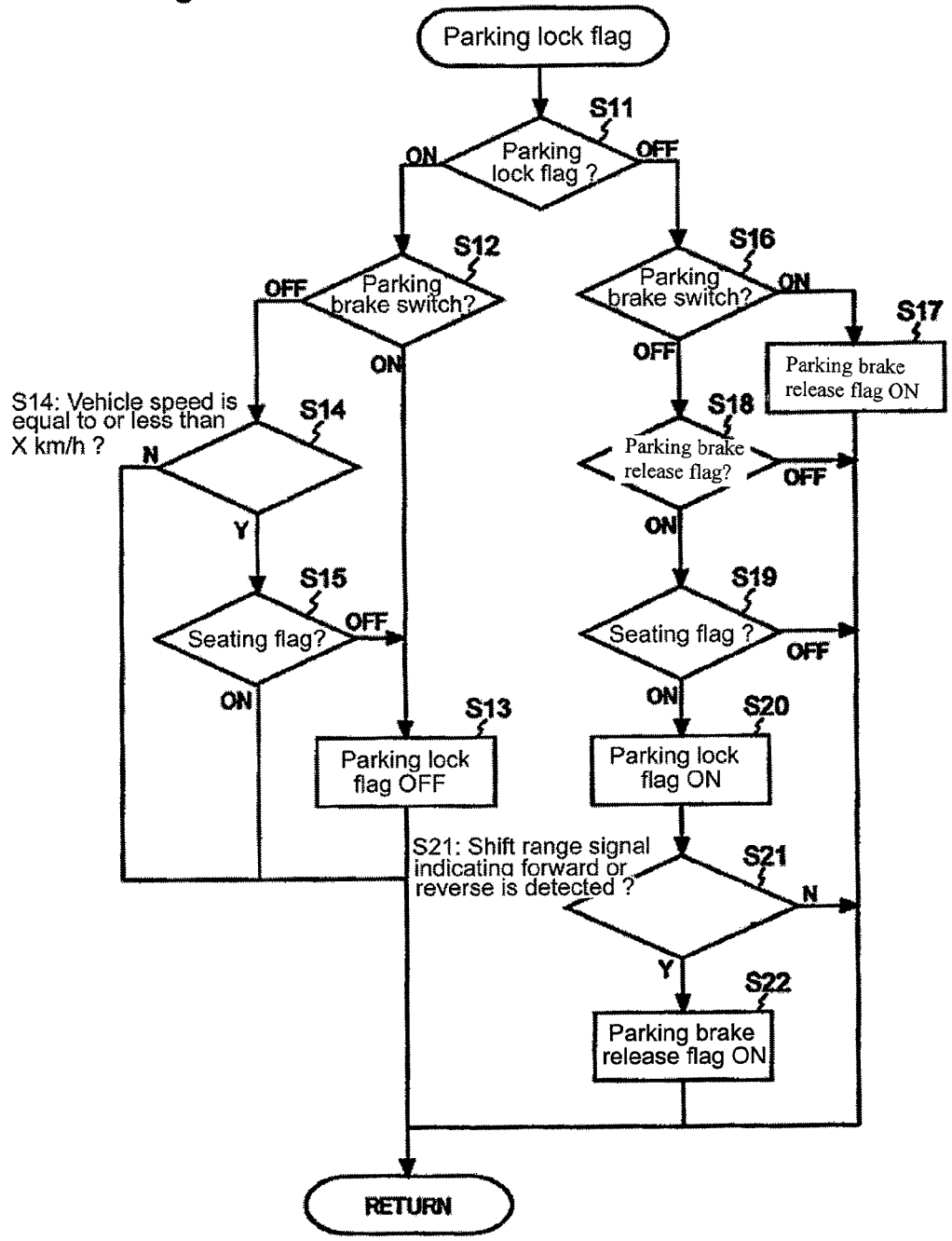
FIG. 4 is a flow chart illustrating a setting/releasing process of a parking lock flag according to this embodiment.
Figure 5:
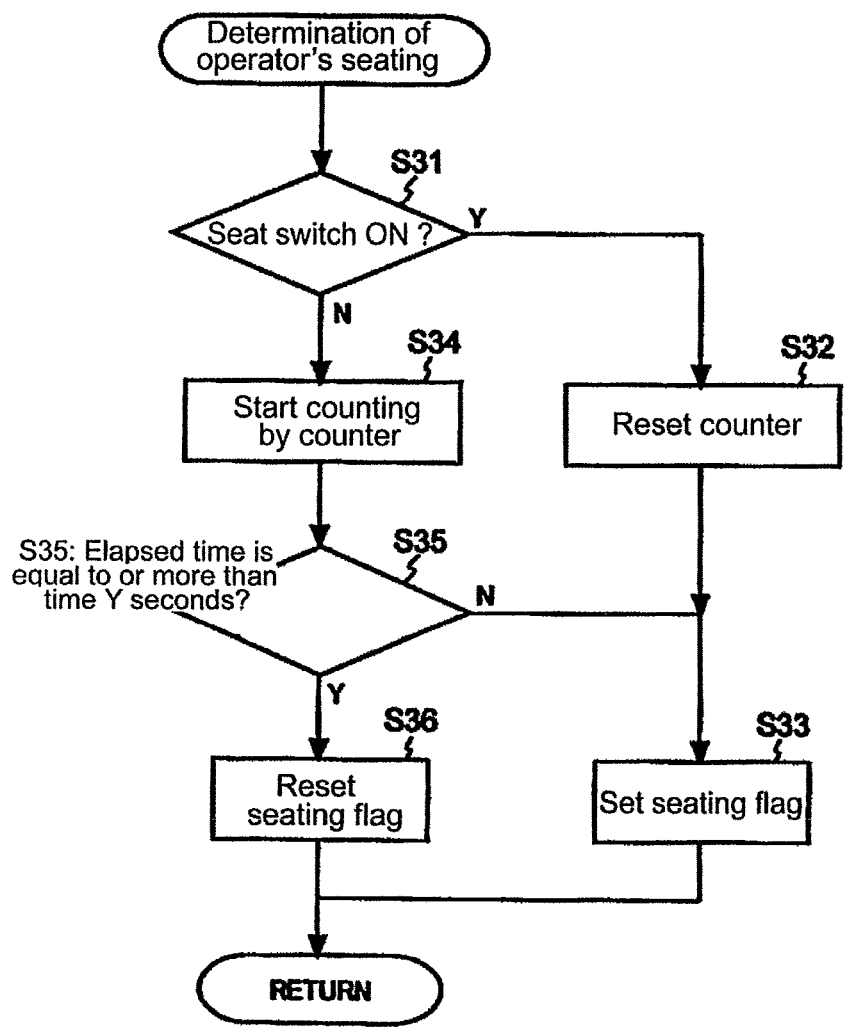
FIG. 5 is a flow chart illustrating seating determination processing according to this embodiment.

FIGS. 1 and 2 are a schematic configuration view and a block diagram of a control device according to an embodiment of the invention and a peripheral device thereof, FIG. 3 is a state transition diagram illustrating control according to the embodiment of the invention, FIG. 4 is a flow chart illustrating a control process of a parking brake according to this embodiment and illustrating a setting/releasing process of a parking lock flag according to this embodiment, and FIG. 5 is a flow chart illustrating seating determination processing according to this embodiment. It is possible to suitably use the configuration according to this embodiment for industrial vehicles represented by material handling machines, such as forklifts and reach stackers, or construction and civil engineering machines, such as motor graders, bulldozers, and wheel loaders.

First, the schematic configuration of a control device applied to this embodiment will be described with reference to FIGS. 1 and 2.

This control device 10 includes a computer having a CPU, a RAM, a ROM, etc., therein, and has input thereto electrical signals from a seat switch 1, a vehicle speed sensor 2, a switch 3a of parking brake operating means 3, shift range detecting means 5, etc. which are provided in an industrial vehicle. On the basis of the signals, the control device 10 controls the energization of a parking brake solenoid (hydraulic opening/closing valve for brake control) 6, thereby controlling the opening/closing of a hydraulic circuit 22, and controls the actuation of a parking brake (parking brake) 7.

In describing the configuration around the parking brake 7 of the invention with reference to FIG. 1, the parking brake operating means 3 actuates the hydraulic negative brake 7a including a coil spring 7d and an hydraulic cylinder 7c via operation transmission mechanisms 7b, such as a wire or a link, by a machine operation or an operation button, thereby performing braking/releasing on an axle (driving wheel 30).

The hydraulic negative brake 7a controls the supply of pressure oil to the hydraulic cylinder 7c via the hydraulic circuit 22 by a hydraulic pump 21 driven by an engine 20, and supplies pressure oil to the hydraulic cylinder 7c during traveling to invalidate braking. When pressure oil is not supplied to the hydraulic cylinder 7c, the brake is brought into a braking state by a coil spring 7d.

The parking brake 7 includes the hydraulic negative brake 7a, an operation transmission mechanism 7b, such as a link, and the hydraulic circuit 22.

The parking brake solenoid 6 is a hydraulic opening/closing valve intervening in the hydraulic circuit 22 between the hydraulic pump 21 and the hydraulic cylinder 7c, and the opening/closing thereof is controlled on the basis of a signal from the control device.

Additionally, the control device is adapted to actuate warning means 8 if necessary by this input signal. The processing flow of the control device 10 will be described below in detail.

Among the above, the seat switch 1 is a limit switch which detects an operator's seating state, and is adapted so as to be brought into a seating detection state in conjunction with the operator's weight when the operator takes a seat 1A, and to be brought into an absence detection state when the operator is away from the seat. At this time, a plurality of elastic members is disposed inside the seat 1A, and a plate which constitutes the seat is elastically supported by the elastic members. Further, an actuating portion of the seat switch 1 is connected to an end of this plate.

Additionally, the seat switch 1 is electrically connected to the control device 10, and when the seat switch 1 is brought into a seating detection (ON) state, the signal of the seat switch is input to the control device 10. For example, a normally-closed switch constitutes the seat switch 1, and the control device 10 detects that the operator is absent as the seat switch 1 is closed and a terminal voltage drops when an operator does not take the seat, and detects that the operator takes the seat as the seat switch 1 is opened and a terminal voltage does not drop. In addition, the seat switch 1 may adopt a hydraulic mechanism or a mechanical mechanism other than an electric mechanism (a limit switch or a magnet switch) as described above.

The vehicle speed sensor 2 is a device which detects the vehicle speed of an industrial vehicle and which includes, for example, a rotational frequency sensor 2a provided in a final reduction mechanism or an axle shaft, and a device or the like which inputs a vehicle speed signal based on a rotational frequency pulse to the control device 10 is used for the vehicle speed sensor.

The parking brake operating means 3 is a means which is disposed at a control portion of a vehicle to control the parking brake 7 directly by operation of the operator, and a switch type, such as a parking switch, a lever type, a stick type, or a foot-operation type, is used for the parking brake operating means.

The shift range detecting means 5 is a switch which detects a shift range (for example, Forward: F, Neutral: N, and Reverse: R) input by the shift operating means 4, and outputs a shift range detection signal to the control device 10. The shift operating means 4 is a device which is disposed at the control portion for the operator to set to a desired shift range, and a shift lever, a shift switch, etc. are used for the shift operating means.

As shown in FIG. 1, the parking brake solenoid 6 is a device for controlling the validity/invalidity of the parking brake 7. In the case of a configuration where the parking brake 7 includes the hydraulic negative brake 7a, the parking brake solenoid is provided between the pump 21 driven by the engine (prime mover) 20, and the parking brake 7, and is adapted so as to control energization to the parking brake solenoid 6, thereby controlling the validity/invalidity of the parking brake 7 via the hydraulic negative brake 7a provided in a hydraulic path from the pump 21 to the parking brake 7. Additionally, in this embodiment, predetermined calculation processing is performed by the control device 10 on the basis of input signals from the seat switch 1, the vehicle speed sensor 2, and the shift range detecting means 5 as well as the control signal from the parking brake operating means 3, and the parking brake solenoid 6 is also controlled by a control signal based on these calculation results.

Although the parking brake 7 in this embodiment is any of a hydraulic brake system, such as a hydraulic actuated brake, an air brake system (including a full air shutter or an air/fluid pressure complex type) which uses air pressure as a pressure source, and an electric motor type brake system which generates a braking force on the torque of an electric motor, it is preferable that the parking brake is a wet brake system other than the electric motor type. More preferably, a negative type brake mechanism is used. The negative type brake 7a becomes a mechanism in which a brake is actuated by the biasing force of the coil spring 7d provided in the parking brake as mentioned above, and the brake is released as the oil pressure of the hydraulic pump 21 driven by the engine 20 is supplied to the hydraulic cylinder 7c via the parking brake solenoid 6. By adopting a brake system having a negative mechanism other than the electric motor type as described above, the brake is actuated even in a situation where the solenoid is not actuated due to disconnection or the like of the solenoid. Therefore, safety is secured.

Hereinafter, the ON state of the parking brake solenoid 6 indicates a state where an electromagnetic hydraulic valve incorporated into the solenoid is opened, and the oil pressure of the hydraulic pump 21 driven by the engine 20 is supplied to the hydraulic cylinder 7c via the parking brake solenoid 6, which leads to invalidity that the braking force of the brake is not exhibited, and the OFF state of the parking brake solenoid 6 indicates a state where the electromagnetic hydraulic valve incorporated into the solenoid is closed, the brake is actuated by the biasing force of a coil spring 7d provided in the parking brake 7, and the braking force of the brake becomes valid.

Moreover, in this embodiment, it is preferable to include the warning means 8. The warning means 8 is a means for issuing a warning to the operator who has left his/her seat without applying the parking brake 7 so as to apply the parking brake 7, and includes, for example, a warning buzzer which outputs a voice or a warning sound, or a warning lamp which turns on/off a lamp.

By the above configuration, the control shown in FIG. 3 is executed in this embodiment.

When an industrial vehicle has stopped, the parking brake solenoid 6 is in an ON state where a braking force is not applied to the parking brake 7, and the warning means 8 is also OFF. If the operator is away from the seat, the absence state is detected by the seat switch 1, counting of a counter 11 is started. Thereafter, if the elapsed time for which a state where the vehicle speed detected by the vehicle speed sensor 2 is equal to or less than a predetermined vehicle speed X km/h (which will be described later in FIG. 4) lasts and which is counted by the counter 11 becomes equal to or more than the set absence time Y seconds (which will be described later in FIG. 5), the control device 10 determines that the operator has completely left his/her seat, the parking brake solenoid 6 is switched to OFF by a control signal from the control device 10, and the parking brake 7 is actuated and brought into a control state during lock. At this time, the warning means 8 is turned ON.

In addition, the counter is reset if the vehicle speed detected by the vehicle speed sensor 2 becomes equal to or more than the predetermined vehicle speed X km/h after the counting of the counter 11 has been started.

Then, when the operator takes the seat, bringing the seat switch 1 into an ON state, the braking operation of the parking brake operating means 3 is performed by the operator, and the output of an ON signal from the parking brake switch 3a is detected by the control device 10, a control state during normal manual lock is brought about. Here, the state "during manual lock" is a state where the operator validates the parking brake 7 by the parking brake operating means 3. At this time, although the vehicle state is the same state as the state during brake lock, the parking brake solenoid 6 is switched to an OFF state, the parking brake 7 is valid, and the warning means 8 is switched to OFF.

Moreover, if the braking release operation of the parking brake operating means 3 is performed from a braking state during manual lock, the output of an OFF signal from the parking brake switch 3a is detected by the control device 10, and an ON signal from the seat switch 1 is detected, the vehicle returns to a stopped state where a locked state by the seat switch 1 is released and the parking lock is not applied.

That is, in this embodiment, in order to resume driving from the brake locked state based on the seat switch 1, etc., it is necessary to detect that the operator has taken his/her seat by the seat switch 1, and to bring the parking brake switch 3a into an ON state first, and then bring the parking brake switch into an OFF state. When a series of these operations are detected by the control device 10, the locked state by the seat switch 1 is first released.

Next, the processing flow by the aforementioned control device 10 will be described in detail with reference to FIGS. 4 and 5.

The setting/releasing processing flow of a parking lock flag is shown in FIG. 4. Here, the above parking brake control shown in FIG. 3 is performed on the basis of the set or released parking lock flag.

First, the setting of the parking lock flag is confirmed by the control device 10 (S11), and if this setting is ON, it is first detected whether or not the parking brake switch (parking brake operating means) 3a is turned ON (S12). If the parking brake switch 3a has already been turned ON, the parking lock control according to this embodiment is unnecessary because the parking brake 7 is in a braking state. Thus, the parking lock flag is set to OFF (S13).

On the other hand, if the parking brake switch 3a is OFF, (i.e., if the parking brake 7 is in a non-braking state), the control device 10 executes the brake control operation of the invention, and first determines whether or not the detected vehicle speed is equal to or less than a predetermined vehicle speed X km/h indicating a stopped state, according to an input signal from the vehicle speed sensor 2 (S14). In addition, the predetermined vehicle speed X km/h is preset in the control device 10. If the detected vehicle speed is equal to or more than the predetermined vehicle speed X km/h, it is determined that the vehicle is traveling, and return is made.

If the detected vehicle speed is equal to or less than the predetermined vehicle speed X km/h, it is then determined whether or not a seating flag is in an ON state (S15). This seating flag is a flag indicating whether or not the operator is in the seat 1A on the basis of the input signal from the seat switch 1. The setting of ON/OFF of this seating flag will be described later with reference to FIG. 5. In this case, if the preset set absence time corresponding to the time until the operator leaves a vehicle after the operator leaves his/her seat has lapsed, the seating flag is turned OFF, it is determined that the operator has completely left his/her seat to exit the vehicle, the parking lock flag is switched to OFF after the control of outputting a control signal which validates the parking brake 7 to the brake solenoid, thereby automatically validating the parking brake 7, and return is made (S13).

If the operator takes his/her seat before the set absence time has lapsed, the seating flag is set to ON, and return is made (S13).

On the other hand, if the parking brake 7 is in a braking state by the above processing operation, the parking lock flag is turned OFF.

Thereafter, if the braking state is released, it is determined that the parking brake switch 3a is turned ON (S16), and return is made after the parking brake release flag is set to ON after the parking brake switch 3a is turned OFF (S17).

Then, if the parking brake switch 3a is OFF (S16), and the parking brake release flag is ON (S18), it is determined that the operator takes his/her seat by the seat switch 1 (S19) (that the seating flag is ON). If this seating flag is ON, the fact that the braking operation of the parking brake operating means 3 has been performed (the parking brake 7 has been switched from the parking brake operating means 3 to the valid side) is confirmed by the parking lock flag being ON (S20). Further, an input signal indicating forward or reverse is detected by the shift range detecting means to set a flag to ON (S21). Thereafter, the fact that the operator has switched the parking brake from the valid side to the release side is confirmed, and the parking brake release flag is set to ON (S22), thereby releasing the parking brake.

Additionally, if the seating flag is OFF (if operator's seating is not confirmed), and the input signal indicating forward or reverse is not detected by the shift range detecting means 5 (in the case of neutral), the braking state of the aforementioned parking brake is maintained, and return is made without changing the parking lock flag and the parking brake release flag.

Next, the seating determination processing flow will be described with reference to FIG. 5.

First, whether or not the seat switch 1 is ON is determined by the control device 10 (S31). If the seat switch 1 is OFF (i.e., if the operator takes the seat 1A), the counter 11 is reset (S32), and the seating flag is set to an ON state (S33).

On the other hand, if the operator has left the seat 1A and the seat switch 1 is turned OFF, counting is started by the counter 11 (S34), and whether or not the counted absence time has exceeded Y seconds is determined (S35). If the counted absence time has exceeded Y seconds (set absence time), the seating flag is reset to OFF (S36), and it is determined that the operator has completely left the vehicle.

In addition, as for the set absence time, the time corresponding to the time until the operator leaves the vehicle after the operator has left his/her seat is statistically obtained (for example, A−3θ, A: Average value, θ: Standard deviation) in advance, and this time is set in the control device 10 as the set absence time Y seconds.

In this way, according to this embodiment, operator absence is reliably detected, and the safety during absence improves.

That is, the time when the operator has left his/her seat is counted by the counter 11, and it is determined as absence only when the absence time becomes equal to or more than the set absence time which is statistically obtained in advance. Therefore, it is possible to prevent absence from being erroneously detected, for example, when the operator has risen up momentarily from the seat although the operator is in his/her seat, and it is possible to reliably determine the absence state. Additionally, since the vehicle stopped state is determined by the vehicle speed sensor 2, it is possible to adopt a configuration in which the stopped state is reliably distinguished, and the above-described control is executed only in the stopped state.

Additionally, by adopting in the hydraulic negative brake 7a as the parking brake 7, the parking brake 7 is necessarily brought into a valid state and it is possible to provide an apparatus with high safety when an engine is turned OFF during stopping and the braking operation of the parking brake 7 is performed or when trouble or a defect has occurred in a machine operating portion of the parking brake 7.

Additionally, it is possible to enhance the safety of driving by adopting a configuration in which a vehicle does not start if the operator does not perform the operation of validating the parking brake 7 once by the parking brake operating means 3.

Moreover, when the parking lock control is released, safety is further increased by releasing the parking brake 7 only when an input signal indicating forward or reverse has been detected by the shift range detecting means 5 in addition to the aforementioned release conditions.

Furthermore, by including the warning means 8 for issuing a warning to the operator during the parking lock control, the operator is able to notice that they have forgotten to apply the parking brake 7 as a result of the warning issued to the operator, and it is possible to quickly perform suitable operation during the absence.

INDUSTRIAL APPLICABILITY

In this embodiment, it is possible to avoid the danger of an accident occurring during operator absence. Therefore, it is possible to suitably use the invention for general industrial vehicles represented by material handling machines, such as forklifts and reach stackers, or construction and civil engineering machines, such as motor graders, bulldozers, and wheel loaders where the operator frequently leaves his/her seat temporarily depending on the work.

The invention claimed is:

1. A control device which performs a control of actuating a parking brake during operator's absence in an industrial vehicle including a seat switch which detects an operator's seating state, a vehicle speed sensor which detects vehicle speed, and the parking brake controlled by a brake solenoid,
   wherein the control device includes a counter which counts an elapsed time after the seat switch detects the operator's absence, and sets a preset absence time,
   wherein the control device is constructed such that, when the seat switch has detected absence, it is determined that the operator has completely left the seat and from the vehicle, and a control signal which validates the parking brake is output to the brake solenoid, thereby actuating the parking brake, if the vehicle speed detected by the vehicle speed sensor is equal to or less than a predetermined vehicle speed indicating a vehicle stopped state, and if the elapsed time counted by the counter becomes equal to or more than the set preset absence time,
   the counter is reset if the vehicle speed detected by the vehicle speed sensor becomes equal to or greater than the predetermined vehicle speed after the counting by the counter has started,
   wherein the industrial vehicle includes a shift range detecting means which detects a shift range instructed by shift operating means, and a parking brake operating portion which controls the parking brake by operation of an operator, and
   wherein when all of three signals; a seating detection signal that detects seating detected by the seat switch; a switching signal that detects the parking brake being switched to a valid side in the parking brake operating portion by the operator; and an input signal indicating forward or reverse detected by the shift range detecting means, are detected, the parking brake operating portion releases the parking brake.

2. The control device of an industrial vehicle according to claim 1, further comprising:
   warning means for issuing a warning to the operator when the parking brake is validated.

3. The control device of an industrial vehicle according to claim 1,
   wherein the parking brake is a hydraulic negative brake released by a working fluid supplied from a pump driven by a prime mover provided in the industrial vehicle,
   wherein the hydraulic negative brake controls the supply of pressure oil to a hydraulic cylinder via a hydraulic circuit by the pump driven by the prime mover, and supplies pressure oil to the hydraulic cylinder during traveling to invalidate braking, and
   when the pressure oil is not supplied to the hydraulic cylinder, the brake is brought into a braking state by a spring.

4. An industrial vehicle provided with the control device according to claim 1.

5. An industrial vehicle provided with the control device according to claim 2.

6. An industrial vehicle provided with the control device according to claim 3.

7. The industrial vehicle according to claim 1,
   wherein a suspension serving as a shock absorber is not interposed between a frame or a vehicle body, and an axle.

8. The industrial vehicle according to claim 6,
   wherein a suspension serving as a shock absorber is not interposed between a frame or a vehicle body, and an axle.

* * * * *